United States Patent Office 3,514,297
Patented May 26, 1970

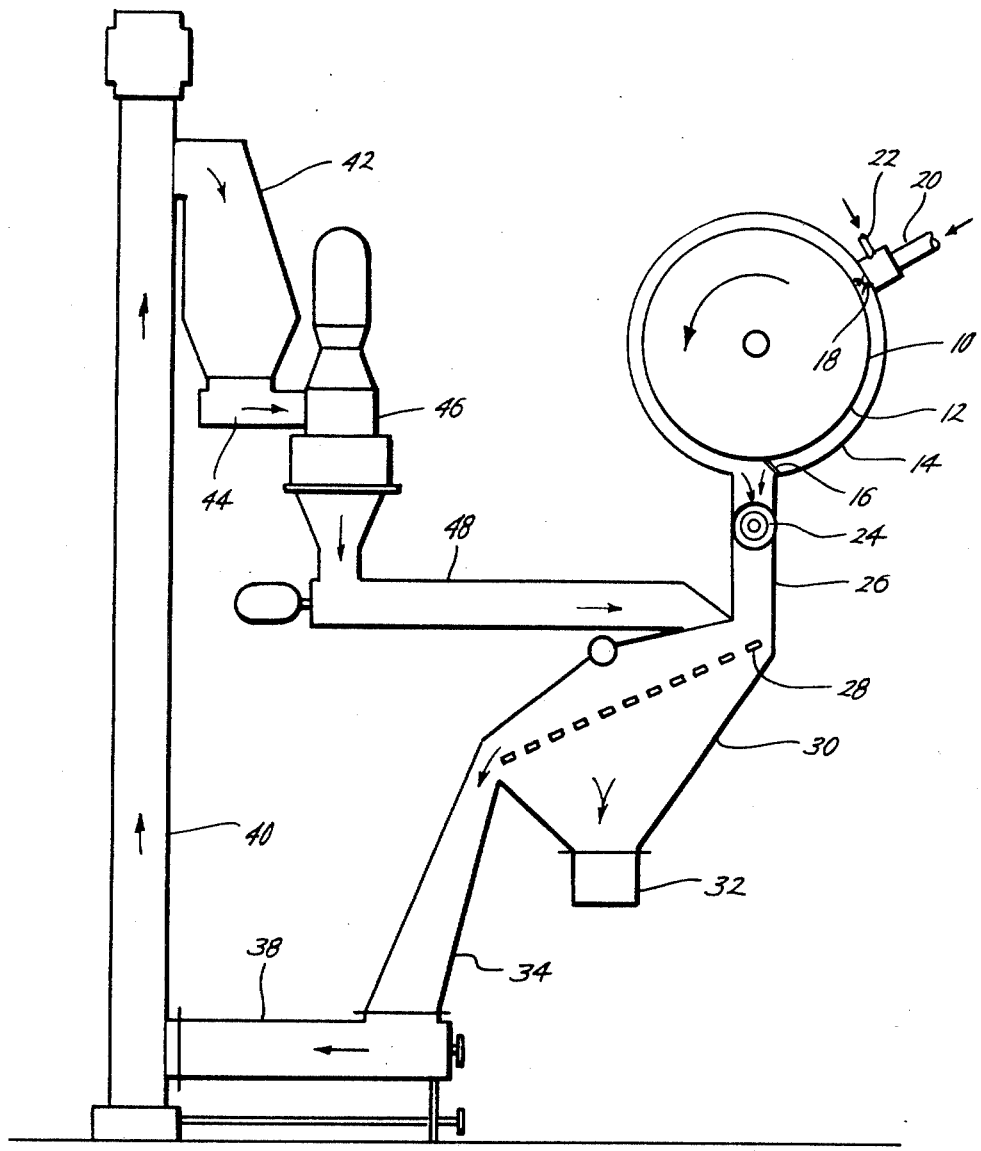

3,514,297
CONTINUOUS PROCESS OF PREPARING
POWDERED FAT
Robert L. Campbell, Jr., Sherman, and Charles H. Wood, Dallas, Tex., and Albert E. Brust, Deerfield, Ill., assignors to Anderson, Clayton & Co., Houston, Tex., a corporation of Delaware
Continuation-in-part of application Ser. No. 523,449, Jan. 27, 1966. This application Jan. 10, 1969, Ser. No. 797,328
Int. Cl. A23d 5/02
U.S. Cl. 99—118    10 Claims

ABSTRACT OF THE DISCLOSURE

A continuous process for preparing powdered fats by spraying liquid droplets of fat onto a cool surface, solidifying the liquid droplets on the cool surface by cooling prior to the droplets being able to run together and form a sheet of film of liquid on the cool surface, removing the solid fat from the cool surface, and grinding at least a portion of the solid fat into powder.

Cross-references to related applications

This is a continuation-in-part of United States patent application No. 523,449, filed Jan. 27, 1966 by Robert L. Campbell, Jr. et al. for an invention in a Process of Preparing Powdered Fat which application No. 523,449 is now abandoned.

Background of the invention

The field of art to which the invention pertains is the manufacture of powdered fat. Powdered fats have various uses such as being a stabilizer in peanut butter to prevent the separation of the oil in the peanut butter after standing.

There are presently two principal methods of forming powdered fat. One is the spray cooling method in which hot liquid fat is sprayed into a tower against refrigerated or cooled air causing the fat to solidify into a powder. This spray cooling method yields a desirable product but is quite expensive.

In the second conventional method, hereinafter referred to as the liquid film method, hot liquid fat is placed in a trough parallel to and closely adjacent the cool surface of a rotating roll or drum commonly called a flaking roll. As the roll turns a film of liquid fat from the trough flows onto the surface of the roll which film solidifies in one revolution and is scraped off by scraping knives before the solidified film of fat reaches the trough. Because the film is solidified, the fat removed by the knives is in the form of flakes. The flakes of fat are then ground into powder.

The flaking rolls do not normally cool the solidified fat in the liquid film method sufficiently to permit the flakes to be ground immediately after coming off the flaking roll as the crystallization of the fat and the grinding process itself cause a rise in temperature which results in material in the grinder or mill becoming too gummy to grind properly. The flakes can be ground if they are cooled sufficiently before the grinding process begins, but this requires excessive refrigeration in the flaking roll, or if they are cooled sufficiently after their removal from the flaking roll such as by the use of Dry Ice, forced air circulation or storage at low enough temperatures for a long enough time. Either excessive refrigeration or cooling after removal from the flaking roll is expensive.

Additionally, droplets of liquid fat have been sprayed onto flaking rolls and scraped therefrom such as by the processes and apparatus illustrated in Pat. No. 1,958,987, issued May 15, 1934 to M. C. Reynolds et al. for a Margarine Process and Pat. No. 778,446, issued Apr. 25, 1905 to A. R. Wilson for a Method of Cooling Melted Fatty Substances but in none of such prior processes in which fat was sprayed onto a flaking roll is there any suggestion that the fat thereafter be ground into powder nor were the advantages realized of using the step of spraying liquid fat onto a roll as one step in the production of powdered fat.

Summary of the invention

It is a general object of the present invention to provide a continuous process for the manufacture of powdered fats which process utilizes a flaking roll but permits the immediate grinding of the fat into powder without excessive refrigeration in the flaking roll or further cooling of the fat after removal from the flaking roll but prior to its being ground.

Another general object of the present invention is to provide a continuous process for the manufacture of powdered fat which permits the grinding of flakes at temperatures above those necessary for the proper grinding of flakes formed by the liquid film method.

Another object of the present invention is to provide a continuous process for the manufacture of powdered fat utilizing a flaking roll but in which the solidified fat scraped from the roll contains a substantial amount of powder in addition to flakes so that only the portion that is in the form of flakes needs to be ground.

Another object of the present invention is to provide a continuous process for the manufacture of powdered fat in which hot liquid fat is deposited as droplets by a spray rather than as a liquid film onto a cool surface such as a flaking roll, the droplets are solidified on the cool surface before they can run together and form a sheet or film of liquid, the solidified fat is scraped off the roll resulting in a portion of the solidified fat being in the form of a powder and the remaining portion in the form of flakes, and thereafter grinding the flakes to a powder.

Other and further objects, features, and advantages will be apparent from the following description of the presently preferred examples of the present invention, given for the purpose of disclosure and taken in conjunction with the accompanying drawing.

The present invention is based upon the discovery that if (1) liquid droplets of fat are sprayed onto a cool surface, (2) the liquid droplets are solidfied on the cool surface by cooling such droplets into a solid fat prior to the droplets being able to run together and form a sheet or film of liquid on the cool surface, (3) the solid fat is removed from the cool surface and (4) the solid fat is ground into a powder, this can be done as a continuous process without the necessity of excessive refrigeration during solidification of the fat and without the necessity of cooling the solidified fat after it is removed from the cool surface and before it is ground. Further, if the solidified fat of the present invention is scraped from the cool surface, a considerable portion of it will be in the form of powder in such size that it is acceptable for many uses wherein powdered fat is desired so that only the remaining portion need be passed through a grinder to be ground in to a powder.

With the process of the present invention wherein the fat is scraped from the cool surface, at least a third of it is normally in the form of acceptable powder so that this fat scraped from the cool surface may be divided by size into first and second portions, the first portion containing the smaller particles and the second portion containing the larger particles, with the first portion being at least one-half by weight the amount of the second portion and only the second portion need be ground.

Applicants are not certain as to why their process permits the solidified fat to be ground into powder immediately upon its removal from the cool surface, but they believe that more heat, including heat of crystallization, is removed from the fat on the cooling surface when it is solidified in the form of droplets rather than after a continuous sheet of liquid forms and that the flakes removed from the cool surface by the present process are smaller in size than those produced by the liquid film method so there is less mechanical work to be done by the grinder and hence less heat developed in the grinder.

Brief description of the drawing

The drawing is a schematic illustration of a presently preferred apparatus which can be used with the process of the present invention.

Description of the preferred embodiments

Referring to the drawing, there is provided a conventional flaking roll 10 having a cylindrical moving cool surface 12 created by rotation of the drum while a cooling medium such as water is moved through the drum in such a manner as to cool its surface 12. The flaking roll 10 rotates in counterclockwise direction and mounted on a shield 14 near the bottom of the flaking roll 12 and rubbing against it is a blade scraper 16. This construction and operation of the flaking drum 10 together with its shield 14, blade 16, and the method of cooling (not shown) is conventional and well known in the art. Such equipment may be purchased on the open market and so no further description of it is necessary.

In the process of the present invention hot liquid fat droplets are deposited onto the surface 12 by spraying liquid fat through one or more nozzles 18 mounted adjacent the cool surface 12 of the flaking roll 10. The nozzle 18 is connected by a conduit 20 to a source of fat, not shown, which has been liquefied by heating by any conventional means. Preferably a supply of air is supplied such as by the line 22 to the nozzle 18 to aid in spraying the liquid fat onto the flaking roll 10.

Droplets of liquid fat sprayed by the nozzle 18 onto the flaking roll 10 are solidified by cooling prior to their being able to run together and form a liquid film on the roll 10. The solidified fat is removed from the roll 10 by the blade 16 falls into a conventional screw conveyor 24 which carries it to the pipe 26 into which it is allowed to fall by gravity. This solidified fat in the form of powder and flakes falls by gravity through the pipe 26 onto a vibrating screen 28 in a hopper 30. Powder of a size smaller than the openings in the vibrating screen 28 falls through the screen 28 and through the outlet 32 in the hopper 30 into bags or other containers not illustrated. The particles that do not pass through the vibrating screen 28 pass by gravity through a pipe 34 to a screw conveyor 38 then to a conventional screw lift 40 which carries these particles to a hopper 42. The hopper 42 feds the particles by gravity into an auger 44 which moves them into a grinder or hammer mill 46 of conventional design such as a Rietz mill manufactured and sold by Rietz Manufacturing Co., Santa Rosa, Calif. Grinders such as the grinder 46 are conventional and no further description of it is necessary.

The ground particles from the grinder 46 pass by gravity into another screw conveyor 48 which moves them to the hopper 30 where they are deposited by gravity and flow onto the vibrating screen 28. Material which has been ground fine enough to pass through the screen 28 will do so and any residue that is left over will again be moved over the screen 28 and back up to the grinder 46 for further grinding if any is necessary.

Set forth hereafter are various examples illustrating the process of the present invention.

EXAMPLE 1

Refined, bleached, and deodorized cottonseed oil was hydrogenated to less than 10 iodine value, a melting point of 135±3° F. and a titer of 60 and then superglycerinated to a monoglyceride content of a minimum of 40%. This cottonseed oil was liquefied by heating, passed onto a conventional flaking roll as a liquid film by a trough, allowed to solidify on the flaking roll, scraped from the roll, collected and passed through a Rietz mill at various temperatures between 78° and 40° F. When the temperature of the flakes to the mill was 78° F., the product temperature from the mill increased to 120° F. after less than 100 lbs. of flakes were passed through the will and the mill plugged. The ground product was very coarse and gummy. It was necessary that the temperature of the flakes to the mill be reduced to approximately 40° F. before grinding at a sustained rate was possible without causing difficulty in the mill.

Fat of the same composition was liquefied by heating to a temperature of 170° F. and sprayed through a nozzle having an orifice on the oil side of 0.10 inch and an orifice on the air side of 0.189 inch. There was 10 p.s.i.g. air pressure and 20 p.s.i.g. oil pressure at the nozzle. This fat was sprayed onto a conventional flaking roll cooled by water having an inlet temperature of 40° F. and an outlet temperature of 43° F. Under these conditions the liquid droplets of the fat from the nozzle solidified on the flaking roll prior to their being able to run together to form a sheet of liquid. The solid fat was removed by a scraper, passed to a mill and ground continuously and satisfactorily at inlet temperatures to the mill of approximately 55° F.

EXAMPLE 2

Refined, bleached, and deodorized cottonseed oil was hydrogenated to an iodine value of less than 10, a melting point of 143±3° F. and a titer of 60. It was heated to above its melting point, deposited on a flaking roll as a sheet of liquid from a conventional trough, allowed to solidify on the flaking roll, removed by a scraper, and stored over night at 46° F. The flakes were then passed through a mill with an 8-mesh screen but it ground poorly and required nearly eight hours to grind 2,000 lbs. of this product. It was found that by holding the temperature of the flakes at 40° F. at the inlet to the mill, the grinding rate could be increased to slightly in excess of 1,000 lbs. per hour. These rates represent the hourly rate based on an 8-hour run and reflect the down time necessary to clean the mill.

The same fat was liquefied by heating to 170° F., passed through the same nozzle described in Example 1 with 10 p.s.i.g. air pressure and 23 p.s.i.g. oil pressure, and sprayed onto the flaking roll which was cooled by water having an inlet temperature of approximately 50° F. and an outlet temperature of approximately 55° F. Under these conditions the liquid droplets solidified into solid fat prior to their being able to form a sheet of liquid on the flaking roll. The solid fat was removed by a scraper, passed to a mill at temperatures between 65 and 70° F. and were satisfactorily ground at the rate of 1,500 lbs. per hour.

EXAMPLE 3

The same cottonseed oil as in Example 2 was solidified as described in the second paragraph of Example 2 above, removed from the flaking roll by a scraper and then passed over a 10-mesh screen. 53.75% of the material was held on the screen while the remainder, 46.25%, passed through the 10-mesh screen. Material that passes through a 10-mesh screen is acceptable for many purposes and thus only 53.75% needed to be passed through the mill. When the same fat is deposited upon a flaking roll as a liquid film rather than in accordance with the process of the present invention, is allowed to solidify, and is removed from the roll by a scraper, only an inconsequential portion of it, far less than 46.25%, will pass through a 10-mesh screen.

EXAMPLE 4

Refined, bleached, hydrogenated, deodorized peanut oil with an iodine value of less than 10 and a melting point of 150±3° F. was liquefied by heating to 178° F. and passed through the same nozzle as described in Example 1 with an air pressure of 10 p.s.i.g. and an oil pressure of 30 p.s.i.g. onto a flaking roll having an inlet water temperature of 60° F. and an outlet water temperature of approximately 65° F. Under these conditions, the peanut oil solidified into solid fat prior to the droplets being able to form a sheet of liquid on the surface of the flaking roll. This solid fat was removed from the flaking roll by scraping and at least one-third of it was of sufficient size that it would pass through a 10-mesh screen.

From the foregoing discussions, examples, and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:
1. A continuous process of preparing powdered fat comprising:
   (a) spraying droplets of liquid fat onto a cool surface,
   (b) solidifying the liquid droplets on the cool surface by cooling such droplets into a solid fat prior to the droplets being able to run together and form a film of liquid on the cool surface,
   (c) removing the solid fat from the cool surface and,
   (d) grinding the solidified fat into a powder prior to any cooling of the fat after step (c).
2. The process of claim 1 in which the cool surface is moving.
3. The process of claim 1 in which the cool surface is cylindrical in shape.
4. The process of claim 1 in which step (c) is performed by scraping.
5. The process of claim 1 in which the fat is selected from the group consisting of cottonseed oil and peanut oil.
6. A continuous process of preparing a powdered fat comprising:
   (a) spraying droplets of liquid fat onto a moving cool surface,
   (b) solidifying the liquid droplets on the cool surface by cooling such droplets into a solid fat prior to the droplets being able to run together and form a film of liquid on the cool surface,
   (c) scraping the solidified fat from the cool surface,
   (d) separating the fat scraped from the cool surface by size of particles of fat into first and second portions, the first portion containing the smaller particles and the second portion containing the larger particles of fat, said first portion being at least one-half the weight of the second portion, and
   (e) grinding the second portion free of the first portion prior to any cooling of the fat after step (c).
7. The process of claim 6 in which the cool surface is cylindrical in shape.
8. The process of claim 6 in which the fat is selected from the group consisting of cottonseeed oil and peanut oil.
9. The process of claim 1 in which the liquid fat of step (a) has a melting point in excess of about 132° F.
10. The process of claim 6 in which the liquid fat of step (a) has a melting point in excess of about 132° F

References Cited

UNITED STATES PATENTS

| 788,446 | 1905 | Wilson | 99—118 X |
| 1,323,367 | 1919 | Kohman et al. | 241—23 |

OTHER REFERENCES

Perry, John H.; Chemical Engineers' Handbook, 3rd ed., 1950, McGraw-Hill Book Co., N.Y., p. 1141.

MAURICE W. GREENSTEIN, Primary Examiner

U.S. Cl. X.R.

241—23; 264—5; 62—1, 74, 320; 260—398